United States Patent

Hall

[15] 3,669,908

[45] June 13, 1972

[54] ALKADIENYL PYRIDINES AND PYRAZINES AS PERFUMES

[72] Inventor: John B. Hall, Rumson, N.J.

[73] Assignee: International Flavors & Fragrances, Inc., New York, N.Y.

[22] Filed: Sept. 2, 1969

[21] Appl. No.: 854,787

[52] U.S. Cl. ...........................................................252/522
[51] Int. Cl. ..........................................................C11b 9/00
[58] Field of Search...........................424/258, 263; 252/522

[56] References Cited

UNITED STATES PATENTS 2,427,286   9/1947   Knapp et al............................424/258

OTHER PUBLICATIONS

Pines et al., J. Org. Chem., 32 3183–3186 (1967).
Ohloff, " Chemie der Geruchs-und Geschmackstoffe," Springer–Verlag–1969 pp. 186–251.

Primary Examiner—Albert T. Meyers
Assistant Examiner—Vincent D. Turner
Attorney—Arthur L. Liberman and Ward, McElhannon, Brooks & Fitzpatrick

[57] ABSTRACT

Novel alkadienyl substituted pyridines and pyrazines, perfume and fragrance compositions containing such substituted pyridines and pyrazines and processes for producing same.

3 Claims, No Drawings

ALKADIENYL PYRIDINES AND PYRAZINES AS PERFUMES

BACKGROUND OF THE INVENTION

There is a continuing search for materials having desirable fragrance properties. Such materials are sought either to replace costly natural materials or to provide new fragrances or perfume types which have not heretofore been available. Especially desirable qualities for substances having interesting fragrances are stability in a wide variety of perfumed articles and perfume compositions, ease of manufacture, and intensity and pleasantness of aroma.

THE INVENTION

The invention comprises the novel products, as well as novel processes according to which such products are manufactured, the specific embodiments of which are described hereinafter by way of example and in accordance with which it is now preferred to practice the invention.

Briefly, the present invention provides novel alkadienyl-substituted heterocyclic nitrogen compounds, particularly pyridines and pyrazines having the general formulas:

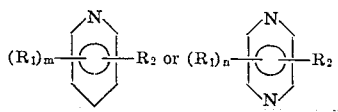

wherein $R_1$ and $R_2$ are substituents on the carbon atoms of the heterocyclic rings; wherein $R_1$ is either H or lower alkyl; wherein m is 1,2,3 or 4; wherein n is 1, 2 or 3 and wherein $R_2$ is a C–11 non-allenic alkadienyl moiety. Perfume and fragrance-modifying materials containing such pyridines and pyrazines are also contemplated herein.

The novel heterocyclic compounds are obtained by novel processes involving the reaction of a picoline ($\alpha,\beta$ or $\gamma$ methyl pyridine) or a methyl pyrazine with a C–10 alkadienyl halide, tosylate, mesylate or similar sulfonic acid esters, as more fully described hereinafter.

More specifically, this invention contemplates C–11 alkadienyl nitrogen heterocyclic compounds which can additionally contain one or more alkyl substituents on a ring carbon atom. Desirably, the alkyl group is a lower alkyl group and it preferably contains from one to about three carbon atoms. Thus, the invention encompasses, but is not limited to the following compounds:

2-(4,8 dimethyl 3,7-nonadienyl)pyridine
3-(4,8 dimethyl 3,7-nonadienyl)pyridine
4-(4,8 dimethyl 3,7-nonadienyl)pyridine
2-(4,8 dimethyl 3,7-nonadienyl)pyridine
2-ethyl-4-(4,8 dimethyl 3,7-nonadienyl)pyridine
2-(4,8 dimethyl 3,7-nonadienyl)5-ethylpyrazine
2-(4,8 dimethyl 3,7-nonadienyl)5-n-propylpyrazine The compounds of this invention occur in various isomeric forms such as "cis-cis," "trans-trans," "cis-trans," and "trans-cis," and such isomeric forms are contemplated within the scope of the invention and included in the formulas shown.

It has been found that, unlike known nitrogen heterocyclic compounds such as those described in U.S. Pat. No. 2,427,286 and in Pines et al., J. Org. Chem. 32, 3183, 1967, the compounds of this invention themselves possess qualities (depending upon position of ring-substitution) associated with "ocean-spray" or "seashore" aromas, or "nut-like" aromas. These fragrance qualitites particularly adapt the novel nitrogen heterocyclic compounds of this invention for incorporation into perfume compositions and fragrance-modifying compositions having desirable seashore aromas or nut-like aromas. Even small percentages of the compounds of this invention will alter, improve, modify or vary the odor impression so as to impart either such seashore or nut-like notes. It will be appreciated by those skilled in the art, from the present disclosure, that the fragrance character of the finished perfume compositions can be tailored to specific uses, as more fully described hereinafter.

A number of different starting materials can be utilized to produce the novel nitrogen heterocyclic compounds of this invention.

In one method of this invention a methyl pyridine ("-picoline") or methylpyrazine is reacted with a C–10 alkadienyl halide, tosylate or mesylate or similar C–10 alkadienyl sulfonic acid ester in the presence of an alkali metal or alkali metal amide or hydride to form the corresponding C–11 alkadienyl pyridine or pyrazine. The procedure is similar to that set forth in Brown & Murphy JACS 73, 3308 (1951). Examples of C–10 alkadienyl halides, tosylates and mesylates useful as reactants and contemplated within the scope of this invention are myrcene hydrochloride, myrcene hydrobromide, geranyl chloride, geranyl bromide, neryl chloride, neryl bromide, geranyl tosylate, and geranyl mesylate. The structures of the aforementioned halides are set forth in U.S. Pat. No. 2,882,323. Examples of methylpyridines and methylpyrazines useful as reactants and contemplated within the scope of this invention are 2-methylpyridine; 2-methyl-5-ethylpyridine; 2-methyl-5,6 diethylpyridine; 4-methyl-5-ethylpyridine; 4-methyl-5-propylpyridine; 2-methylpyrazine; 2-methyl-5-ethylpyrazine; 2-methyl-3-ethylpyrazine; 2-methyl-5,6-diethylpyrazine; and 2-methyl-5 (i-propyl)pyrazine.

The reaction is carried out preferably at atmospheric pressure and at temperatures of the order of 0° C. up to 100° C. It is preferred to use an excess of the methyl pyridine or methyl pyrazine compound; of the order of 10–150 percent. The reaction is carried out in the presence of an alkali metal or alkali metal amide or hydride, such as sodium metal, potassium metal, lithium metal, sodium amide, sodium hydride, potassium amide or lithium amide.

At the completion of the reaction, the reaction mixture is preferably poured into water and purified. The novel compounds are recovered from the reaction mixture by suitable techniques such as distillation, extraction, chromatographic techniques and the like. It has been found that fractional distillation under vacuum is a desirable way to obtain the pure compounds from the reaction mixtures.

The instant reaction is summarized as follows:

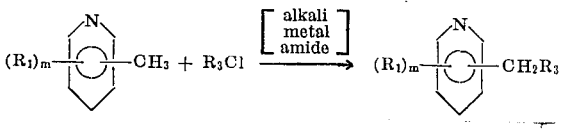

wherein $R_1$ is hydrogen or lower alkyl, $R_3$ is C–10 alkadienyl and m is 1, 2, 3 or 4. The C–11 alkadienyl pyridines and pyrazines produced according to this invention are olfactory agents and can be incorporated into a wide variety of compositions which, when added thereto in small quantities of about one or two percent will be enhanced by their property of imparting additional "seashore" or "nut-like" notes to the fragrance. These materials bring to perfumery a new dimension in ocean spray notes or seashore notes or nut-like notes different from the existing materials now in use. The heterocyclic nitrogen compounds can be added to perfume compositions in their pure forms or they can be added to mixtures of materials in fragrance-imparting compositions to provide a desired fragrance character to a finished perfume material. The perfume and fragrance compositions obtained according to this invention are suitable in a wide variety of perfumed articles and can also be used to improve, enhance, modify, alter, or reinforce natural fragrance materials. It will thus be appreciated that the heterocyclic nitrogen compounds and mixtures thereof of this invention are useful as olfactory agents and fragrances.

The term "perfume composition" is used herein to mean a mixture of compounds, including for example, natural oils, synthetic oils, alcohols, aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling, fresh-smelling materials. Such perfume compositions or the novel materials of this invention can be used in conjunction with carriers, vehicles, solvents, dispersants, emulsifiers surface-active agents, aerosol propellants, and the like.

In perfume compositions, the individual components contribute their particular olfactory characteristics, but the overall effect of the perfume composition will be the sum of the effect of each ingredient. Thus, the nitrogen heterocyclic compounds of this invention can be used to alter the aroma characteristics of a perfume composition, for example, by highlighting or moderating the olfactory reaction contributed by another ingredient of the composition.

The amount of one or more compounds of this invention which will be effective in perfume compositions depends on many factors, including the other ingredients, their amounts and the effects which are desired. It has been found that perfume compositions containing as little as 1.0 percent by weight of the compounds of this invention, or even less can be used to intensify or augment and enhance various types of fragrance compounds, the odors of which may be desired to be imparted to colognes, perfumes, bath oils and other cosmetic products. The amount employed will depend on considerations of cost, nature of the end product, the effect desired in the finished product, and the particular fragrance sought. Higher concentrations (e.g., 4 percent by weight) of the nitrogen heterocyclic compounds of this invention will intensify the "seashore" or "nut-like" notes of the compositions.

The nitrogen heterocyclic compounds disclosed herein can be used in a composition as an olfactory component of a fragrance which in turn can be used in perfumes, colognes, bath preparations (such as bath oils and bath salts) and the like. When the alkadienyl pyridines or alkadienyl pyrazines of this invention are used in finished perfumed articles, such as the foregoing, they can be used in amounts of 0.04 percent or lower.

The following examples serve to illustrate embodiments of the invention as it is now preferred to practice it. It will be understood that these examples are illustrative and the invention is to be considered restricted thereto only as indicated in the appended claims.

EXAMPLE I

Preparation of α(C-11 Alkadienyl)Pyridine

Into a 5-liter three-neck flask equipped with stirrer, thermometer, condenser, addition funnel, drying tube and gas bubbler were placed the following ingredients:
465 g. 2-methylpyridine (5 moles)
500 g. benzene At room temperature, with stirring 200 g. of sodium amide were added. The temperature of the reaction mass was allowed to rise to 80°–85° C. 807 g. of myrcene hydrochloride (3.5 moles) was added to the reaction mass over a period of 1 hour while maintaining the temperature at 80° C. The reaction mass was then stirred for 3 hours at 80° C.

On cooling, 100 cc of water was slowly added. The reaction mass was subsequently poured onto one liter of water and the organic layer was separated and washed first with a 300 cc quantity of 5 percent aqueous sodium hydroxide and then with two 300 cc volumes of water. The solvent was stripped off the organic layer and the reaction product was rushed over at 2 mm Hg. pressure and 130°–140° C. The reaction product was then distilled in a fractionation column at a temperature in the range of 110°–113° C. and a pressure of 0.7 mm Hg. The resulting 2-(4,8-dimethyl-3,7-nonadienyl)pyridine had a distinct nut-like aroma. The following formula was confirmed by NMR, mass spectral and IR analysis:

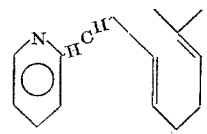

Using the foregoing procedure, when 2-methylpyridine was replaced by 2-methylpyrazine, as a starting reactant, the compound: 2-(4,8-dimethyl-3,7-nonadienyl)pyrazine was synthesized.

EXAMPLE II

Preparation of a γ(C-11 Alkadienyl)Pyridine

Into a 22-liter reaction flask equipped with stirrer, thermometer, additional funnel reflux condenser and gas bubbler were added the following materials:
4,185 g. 4-methyl pyridine (45 moles)
3,600 g. benzene Through an addition tube over a period of 25 minutes, 1,802 g. (45.9 moles) of sodium amide were added, the temperature of the reaction mass remaining at 24°–30° C. The reaction mass was then heated slowly to reflux (pot temperature of 84° C.) and maintained at reflux until gas evolution ceased (4 ½ hours). Over a period of 2 ½ hours while continuing reflux, 6,291 g. of myrcene hydrochloride was added. The reaction mass was refluxed for 3 hours, maintaining the temperature thereof at 90°–94° C. At the end of the reaction the mass was cooled and poured slowly over 9,000 g. of ice and water. The aqueous phase was extracted with a 2 ½ liter volume of benzene and the organic phases were combined and washed with two 3.0 liter volumes of water. The solvent was then stripped off at 100 mm Hg. pressure. The reaction product was rushed over at a vapor temperature of 52°–159° C. (1–15 mm Hg. pressure). The reaction product was then fractionally distilled on a 12 inch Goodloe column at a temperature range of 123°–150° C. and a pressure of 2.4 mm Hg. [reflux ratio 1:1]. The reaction product had a refractive index of $n\ D^{20} = 1.5153$ and a density at 25° C. of 0.9222. Infra red, NMR and mass spectral analysis indicated that the reaction product included a compound having the structure:

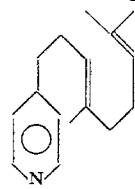

The product had a highly desirable seashore aroma reminiscent of ocean spray.

EXAMPLE III

The following composition is prepared:

| Parts by Weight | Ingredient |
| --- | --- |
| 135 | Linalyl Acetate |
| 275 | Bergamot Oil |
| 135 | Citronellol |
| 135 | Lavandulol |
| 135 | Portugal Oil |
| 40.5 | Neroli Oil |
| 20.5 | Jasmin Oil |
| 20.5 | Jasmin Absolute |
| 28.0 | Neroliol, Bigarade |
| 28.0 | Rosemary Oil |
| 13.5 | 4-(4,8-dimethyl-3,7-nonadienyl)pyridine prepared by the process of Example II |
| 13.5 | Rose Absolute |
| 13.5 | Hydroxy Citronellol |
| 7.0 | Cyclopentadecanolide 10% |

The addition of the 4(C–11 alkadienyl)pyridine in the quantity given adds a distinct seashore aroma to the fragrance.

When the compound 4(4,8-methyl-3,7-nonadienyl)pyridine is replaced with 2-ethyl-4(4,8-dimethyl-3,7-nonadienyl)pyridine or mixtures of these pyridine compounds, the same results as mentioned above are obtained.

EXAMPLE IV

The composition of Example III was incorporated in a cologne in a concentration of 2.5 percent in 85 percent ethanol; and into a handkerchief perfume in a concentration of 20 percent (in 95 percent ethanol). The compounds produced in Example II afforded a distinct and definite seashore aroma, reminiscent of ocean spray to the handkerchief perfume and cologne.

It will be appreciated from the present description that the novel heterocyclic nitrogen compounds can be included in other perfume compositions and in other perfumed articles.

What is claimed is:

1. A perfumed composition comprising a fragrance imparting amount of at least one nitrogen heterocyclic compound having a structure selected from the group consisting of:

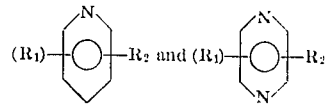

wherein $R_1$ and $R_2$ are substituents on the carbon atoms of the heterocyclic ring; wherein $R_1$ is either hydrogen or lower alkyl; and wherein $R_2$ is a C–11 3,7-alkadienyl moiety and an adjuvant therefor.

2. The perfumed composition of claim 1 wherein the nitrogen heterocyclic compound is 4(4,8-dimethyl-3,7-nonadienyl) pyridine.

3. The perfumed composition of claim 1 wherein the nitrogen heterocyclic compound is 2(4,8-dimethyl-3,7-nonadienyl) pyridine.

* * * * *

UNITED STATES PATENT OFFICE
CERTIFICATE OF CORRECTION

Patent No. 3,669,908   Dated June 13, 1972

Inventor(s) JOHN B. HALL

It is certified that error appears in the above-identified patent and that said Letters Patent are hereby corrected as shown below:

Col. 4, lines 5-10 - The formula should read:

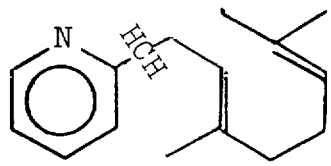

Col. 5, line 6 - Replace "4(4,8-methyl-3,7-nonadienyl)" with --4(4,8-dimethyl-3,7-nonadienyl)--

Signed and sealed this 10th day of October 1972.

(SEAL)
Attest:

EDWARD M. FLETCHER, JR.
Attesting Officer

ROBERT GOTTSCHALK
Commissioner of Patents